Patented Jan. 16, 1951

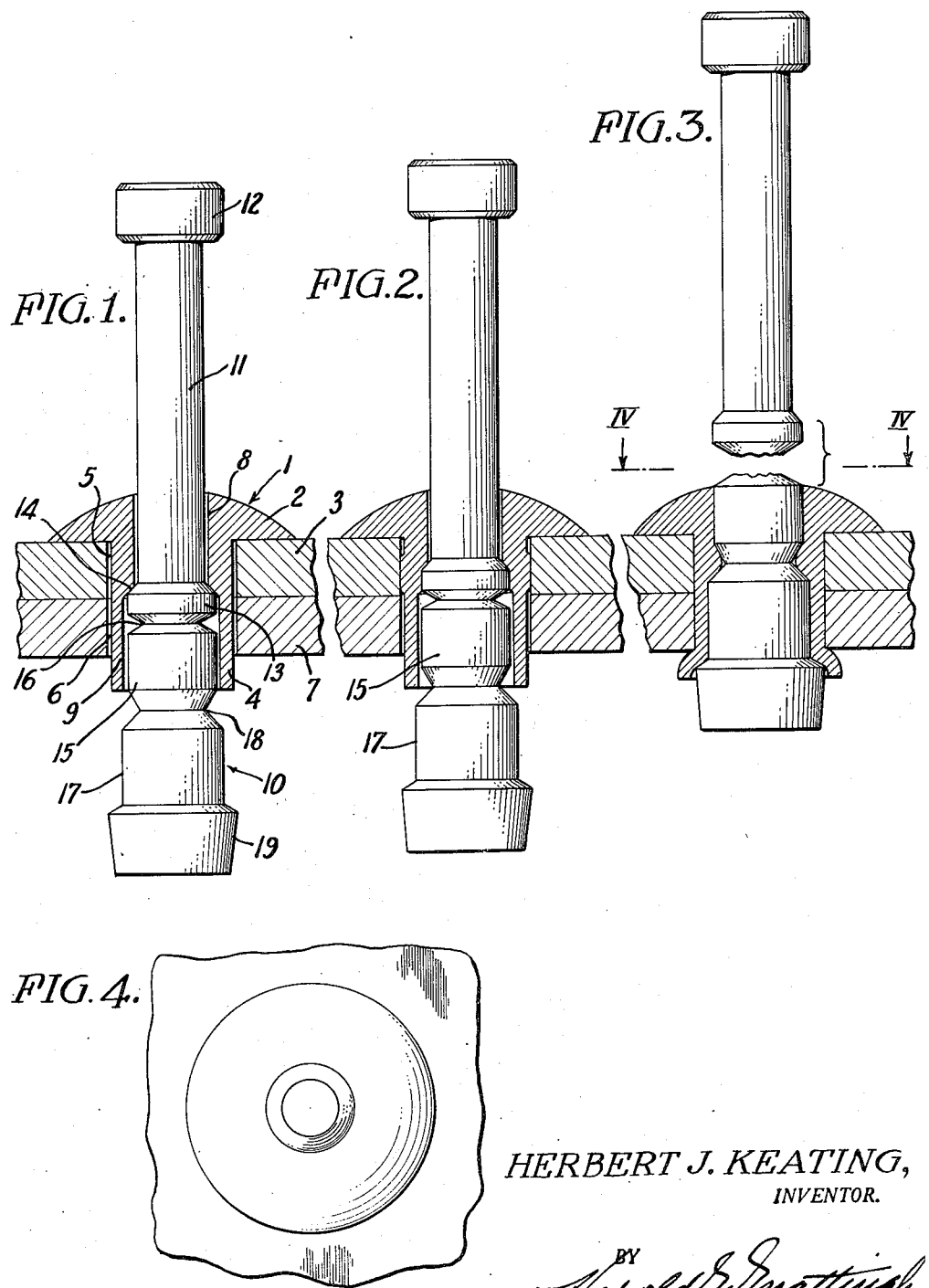

2,538,623

UNITED STATES PATENT OFFICE 2,538,623

RIVET ASSEMBLY

Herbert J. Keating, Pasadena, Calif., assignor to Cherry Rivet Company, Los Angeles, Calif., a corporation of California Application May 14, 1945, Serial No. 593,665

3 Claims. (Cl. 85—40)

My invention relates to rivets and has particular reference to a rivet adapted to be expanded radially into tight engagement with an outer workpiece prior to the expanion of other portions of the rivet into engagement with an inner workpiece to be riveted to the outer workpiece.

In the art of riveting it has been long understood that to perform a secure riveting job between two workpieces it is essential that the shank of the rivet extending through the holes in the workpiece be expanded radially into tight engagement with the workpiece holes. However, all previous methods of riveting have been accomplished by upsetting the shank of the rivet by forces applied to the end of the shank opposite the rivet head, with the result that there was no assurance that the portions of the shank disposed within the outer workpiece would be expanded first and consequently unless the meeting surfaces of the two workpieces were held tightly against each other during the entire upsetting operations it frequently occured that the end of the shank would be both upset and radially expanded in the inner workpiece while the head of the rivet would be loose with respect to the outer workpiece.

It is therefore an object of my invention to overcome this deficiency by performing the riveting operation in a series of successive steps comprising first laterally expanding the portions of the shank adjacent the head into tight engagement with the outer workpiece prior to expanding or upsetting the remaining portions of the rivet shank.

Another object of my invention is to provide a rivet so constructed that the forces applied to upset the shank of the rivet will result in radially expanding the portion of the rivet shank adjacent the head prior to expanding or upsetting the remaining portions of the shank to thus insure that the workpieces will be drawn tightly together at the end of the riveting operation.

Another object of my invention is to provide a blind rivet of the type comprising a rivet body and a mandrel extending therethrough, in which the rivet body and mandrel are so constructed that the exertion of an axial pull between the rivet body and mandrel will, in a series of successive steps, first radially expand the portions of the rivet body shank adjacent the head into tight engagement with the outer workpiece, then radially expand the portions of the rivet body shank disposed within the inner workpiece, and finally upset the projecting end of the rivet body shank to draw the workpieces tightly together.

Another object of my invention is to provide a blind rivet structure of the character set forth in the preceding paragraph wherein an annular groove is formed about the mandrel at a position such that it will be disposed within the shank of the rivet body at the end of the upsetting operations to receive a portion of the metal of the shank to thereby lock the mandrel against inadvertent removal from the rivet body.

Other objects and advantages of my invention will be apparent from a study of the following specifications, read in connection with the accompanying drawings, wherein Fig. 1 is a vertical sectional view taken through one form of rivet assembly which may be employed to practice my invention and illustrating the position of the parts prior to the expansion and upsetting of the rivet shank;

Fig. 2 is a view similar to Fig. 1 and illustrating the position of the parts at the start of the upsetting operations;

Fig. 3 is a view similar to Figs. 1 and 2 and illustrating the position of the parts at the end of the upsetting operations; and Fig. 4 is a plan view of the rivet assembly at the end of the upsetting operations.

Referring to the drawings, I have illustrated one form of rivet assembly which may be employed to practice my invention as comprising a rivet body illustrated generally by the reference character I, preferably provided with a head 2 adapted to rest against the outer surface of the outer work sheet 3 when the shank 4 of the rivet body is inserted in aligned holes 5 and 6 in the work sheets 3 and 7.

The rivet body I is provided with a longitudinal bore extending therethrough, a portion of the bore indicated at 8 being formed with a diameter smaller than the remaining portion 9 of the bore so as to provide a thicker wall for that part of the shank which extends into the hole 5 in the outer work sheet 3 than is provided for that part of the shank disposed within the hole 6 of the inner work sheet.

The rivet assembly includes a mandrel indicated generally by the reference character 10 disposed to extend through the rivet body bore, the mandrel having a stem portion 11 extending through the smaller diameter portion 8 of the rivet body bore and outwardly beyond the head 1 to permit the mandrel to be grasped by an upsetting tool adapted to exert an axial pull between the mandrel and the rivet body, the stem being formed with an enlarged head 12 or other suitable means to permit engagement therewith by the upsetting tool.

The mandrel is formed with a portion 13 of a diameter greater than the diameter of the bore portion 9, the junction between the portion 13 and the stem 11 being tapered as indicated at 14 so that as the mandrel is drawn inwardly of the rivet body that part of the shank disposed within the hole 5 in the outer work sheet will be swaged radially to cause that part of the shank to completely fill the hole in the outer work sheet at a time when no radial expansive forces are exerted upon the remaining portions of the rivet body shank. The effect of first expanding that portion of the rivet shank disposed only in the workpiece contiguous to the head will be not only to insure the complete filling of the hole in the outer work sheet but will provide a tight grip between the rivet body and the outer work sheet prior to the upsetting of the inner projecting end of the rivet body shank.

Immediately below the enlarged portion 13 of the mandrel I provide a second enlarged portion 15 of approximately the same diameter as the portion 13, the junction between the portions 13 and 15 being defined by an annular groove or depression 16 which is preferably of a depth to insure that when the rivet mandrel has been drawn to its innermost position within the rivet body the exertion of additional pulling forces between the body and mandrel will cause the mandrel stem to break at such groove or depression. As shown in Fig. 3, the break will occur at a time when the groove or depression is substantially flush with the outer surface of the head of the rivet body.

Below the mandrel portion 15, I provide a still larger diameter portion 17, the portion 17 being of a diameter in excess of the diameter of the bore portion 9 so that as the mandrel is drawn inwardly of the rivet body the portion 17 will radially expand the inner end of the rivet body shank to cause it to completely fill the hole 6 in the inner work sheet 7. Thus the shank of the rivet body is expanded radially in two successive and independent operations, the first filling the hole in the outer work sheet and the second filling the hole in the inner work sheet. In the event the holes in the inner and outer work sheets are not of exactly the same diameter, the independent expansion of the rivet shank portions will insure the filling of each of the holes by the rivet.

The junction between the portions 15 and 17 of the rivet mandrel is preferably defined by an annular groove or depression 18 while the length of the portions 15 and 17 is such that when the mandrel has been drawn to its innermost position within the rivet body the groove or depression 18 will be disposed within that part of the rivet body shank which initially was formed with a bore of smaller diameter. Thus the upper end of the portion 17 will cause a part of the shank material to spring back slightly to partially fill the groove or depression 18, thus locking the mandrel in its innermost position.

The mandrel is preferably formed with an enlarged upsetting head 19 adapted to engage the projecting end of the rivet body shank to upset the same at the inner side of the inner work sheet 7, as indicated in Fig. 3 though it will be observed that the length of the mandrel portions 15 and 17 is such that the upsetting of the end of the rivet shank will not occur until after the outer portion of the rivet shank has been expanded to fill the hole in the outer work sheet and the radial expansion of the inner portion of the shank to fill the hole in the inner work sheet has been substantially completed.

Thus with the construction of the rivet body and mandrel as illustrated and described herein, the upsetting of the rivet body is accomplished in three successive operations by a single continuous pull exerted between the mandrel and body. The first of these operations secures the rivet in the outer work sheet, the second secures the rivet in the inner work sheet and finally the operation of swaging out the projecting end of the rivet over the edges of the hole in the end of the rivet over the edges of the hole in the inner work sheet is accomplished. The result of providing these independent operations produces a better riveting of the work sheets together, not only against separation of the work sheets but also against any possible shifting of the sheets laterally with respect to each other.

While in the foregoing description I have demonstrated one type of rivet which may be employed to practice my new method of riveting, it will be apparent that other forms of rivets may be successfully employed in the practice of my method so long as the rivet has the characteristic of being capable of radially expanding or swelling out at those portions of the shank adjacent the head of the rivet prior to the swaging out or radial expansion of the remaining portions of the shank. For example, the rivet may be constructed with a rivet body and mandrel similar to that illustrated and more specifically described herein, but in which the mandrel is moved toward the head of the rivet by pressure or a blow exerted upon the upsetting head of the rivet mandrel instead of by a pull exerted on a stem.

Another form of such construction which might be substituted for the blind rivet construction specifically described herein would be a rivet having a head and a shank wherein the portions of the shank spaced from the head are slightly hardened while the portions of the shank disposed adjacent the head are relatively soft so that upsetting forces applied to the end of the shank would cause the shank portions adjacent the head to expand radially prior to any radial expansion or upsetting of the remaining shank portions.

While I have shown and described the preferred embodiment of my invention, I do not desire to be limited to any of the details of construction shown and described herein, except as defined in the appended claims.

I claim:

1. A blind rivet assembly for use in aligned holes in a pair of workpieces, the outermost workpiece of which is of predetermined thickness, comprising a rivet body having a head and a shank for insertion through the aligned workpiece holes, a bore extending longitudinally through the shank, said bore having that portion of its length adjacent the head formed with a smaller diameter than the remaining portions of said bore, said smaller diameter portion having a length along the shank substantially equal to the thickness of the outer workpiece with which it is to be used, and a mandrel in said bore having a portion of its length disposed toward the head of the body formed upon a diameter greater than the smaller bore diameter but smaller than the remaining portions of the bore and a second portion of the mandrel having a greater diameter than the first mentioned portion and larger than the remaining portions of the bore and having an upsetting head disposed further away from the body head for engaging and upsetting the end of the shank, whereby movement of the mandrel toward said head will first expand the body shank portion surrounding said smaller diameter bore against the wall of the hole in one of the work pieces and secondly the second portion of the mandrel will expand the remaining portions of the body shank against the wall of the hole in the outermost work piece and subsequently upset the remaining portions of the rivet body shank.

2. A blind rivet assembly for use in aligned holes in a pair of workpieces, the outermost workpiece of which is of predetermined thickness, comprising a rivet body having a head and a shank for insertion through the aligned workpiece holes, a bore extending longitudinally through the shank, said bore having that portion of its length adjacent the head formed with a smaller diameter than the remaining portions of said bore, said smaller diameter portion having a length along the shank substantially equal to the thickness of the outer workpiece with which it is to be used, a mandrel in said bore having a portion of its length disposed toward the head of the body formed upon a diameter greater than the smaller bore diameter, but smaller than the remaining portions of the bore, a second portion of said mandrel disposed further away from said body head having a diameter greater than the larger diameter of said bore and having an upsetting head disposed beyond said second portion, whereby movement of said mandrel toward said head will first expand the rivet body shank portion surrounding said smaller diameter bore, then radially expand the remaining portions of said shank, and finally upset the end of said shank.

3. A blind rivet assembly for use in aligned holes in a pair of workpieces, the outermost workpiece of which is of predetermined thickness, comprising a rivet body having a head and a shank for insertion through the aligned workpiece holes, a bore extending longitudinally through the shank, said bore having that portion of its length adjacent the head formed with a smaller diameter than the remaining portions of said bore, said smaller diameter portion having a length along the shank substantially equal to the thickness of the outer workpiece with which it is to be used, a mandrel in said bore having a portion of its length disposed toward the head of the body formed upon a diameter greater than the smaller bore diameter but smaller than the remaining portions of the bore, and a second portion of the mandrel having a greater diameter than the first mentioned portion and larger than the remaining portions of the bore, and an upsetting head on said mandrel, the portions of the mandrel being so spaced from each other that the diameters of the bore of the rivet body shank are sequentially expanded against the walls of the holes in the work pieces and subsequently upset the remaining portions of the rivet body shank.

HERBERT J. KEATING.

REFERENCES CITED

The following references are of record in the file of this patent:

UNITED STATES PATENTS

| Number | Name | Date |
| --- | --- | --- |
| 2,061,629 | Huck | Nov. 24, 1936 |
| 2,114,493 | Huck | Apr. 19, 1938 |
| 2,371,423 | Buchet | Mar. 13, 1945 |
| 2,372,222 | Mullgardt | Mar. 27, 1945 |
| 2,384,321 | Lees | Sept. 4, 1945 |